United States Patent
Kwon et al.

(10) Patent No.: US 11,064,063 B2
(45) Date of Patent: Jul. 13, 2021

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Hyemi Jung, Seoul (KR); Arim Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/719,376

(22) Filed: Dec. 18, 2019

(65) Prior Publication Data

US 2020/0128121 A1 Apr. 23, 2020

Related U.S. Application Data

(63) Continuation of application No. 15/633,215, filed on Jun. 26, 2017, now Pat. No. 10,547,726, which is a (Continued)

(30) Foreign Application Priority Data

Sep. 9, 2013 (KR) .................. 10-2013-0107930

(51) Int. Cl.
*G06F 3/048* (2013.01)
*H04M 1/57* (2006.01)
(Continued)

(52) U.S. Cl.
CPC .......... *H04M 1/576* (2013.01); *G06F 3/0488* (2013.01); *G06F 3/04842* (2013.01);
(Continued)

(58) Field of Classification Search
CPC ............ H04M 1/576; H04M 1/72519; H04M 1/72547; H04M 3/42059; G06F 3/04842; G06F 3/0488
(Continued)

(56) References Cited

U.S. PATENT DOCUMENTS

| 8,515,398 B2 * | 8/2013 | Song ................. | H04M 1/27475 |
| | | | 455/414.1 |
| 8,688,096 B2 * | 4/2014 | Mears .................. | H04M 1/576 |
| | | | 455/418 |

(Continued)

FOREIGN PATENT DOCUMENTS

| EP | 1 981 252 A1 | 10/2008 |
| EP | 2 228 977 A2 | 9/2010 |

OTHER PUBLICATIONS

European Search Report issued in application No. 14181335.2 dated Dec. 22, 2014.
(Continued)

*Primary Examiner* — David Phantana-angkool
(74) *Attorney, Agent, or Firm* — KED & Associates LLP

(57) ABSTRACT

A mobile terminal and controlling method thereof are disclosed, by which image data of a counterpart having triggered an event can be displayed. The present invention may include a display unit configured to display information, a wireless communication unit configured to communicate with an external server that stores first image data and to communicate with a counterpart terminal, a memory to store a second image data, and a controller, in response to an event triggered by the counterpart terminal, to extract an image data related to a counterpart from one of the first image data and the second image data, and the controller to output the extracted image data on a portion of the display unit to notify an occurrence of the event.

10 Claims, 20 Drawing Sheets

(a)

(b)

(c)

Related U.S. Application Data continuation of application No. 14/464,768, filed on Aug. 21, 2014, now Pat. No. 9,723,124.

(51) Int. Cl.
*H04M 1/724* (2021.01)
*H04M 1/7243* (2021.01)
*G06F 3/0484* (2013.01)
*G06F 3/0488* (2013.01)
*H04M 3/42* (2006.01)

(52) U.S. Cl.
CPC ......... *H04M 1/724* (2021.01); *H04M 1/7243* (2021.01); *H04M 3/42059* (2013.01); *H04M 2250/02* (2013.01)

(58) Field of Classification Search
USPC ......................................................... 715/753
See application file for complete search history.

(56) References Cited

U.S. PATENT DOCUMENTS

| | | | | |
|---|---|---|---|---|
| 8,731,534 B2* | 5/2014 | Kim | ...................... | H04M 1/576 |
| | | | | 455/418 |
| 8,813,193 B2 | 8/2014 | Kim | | |
| 9,253,305 B2* | 2/2016 | Mori | .................. | H04N 1/00326 |
| 9,414,206 B2* | 8/2016 | Kwon | ..................... | H04W 4/08 |
| 9,467,648 B2 | 10/2016 | Kwon | | |
| 9,514,377 B2 | 12/2016 | Cuthbert | | |
| 9,723,124 B2 | 8/2017 | Kwon | | |
| 9,967,383 B2* | 5/2018 | Karnalkar | ............... | H04W 4/02 |
| 10,104,208 B2 | 10/2018 | Baek | | |
| 2003/0153337 A1* | 8/2003 | Ito | ........................... | H04M 1/57 |
| | | | | 455/517 |
| 2006/0063514 A1 | 3/2006 | Choi et al. | | |
| 2008/0057926 A1* | 3/2008 | Forstall | ............. | H04M 1/72522 |
| | | | | 455/415 |
| 2012/0052850 A1 | 3/2012 | Martin et al. | | |
| 2013/0114849 A1 | 5/2013 | Pengelly | | |
| 2013/0345980 A1* | 12/2013 | van Os | .............. | G01C 21/3626 |
| | | | | 701/538 |
| 2014/0101588 A1* | 4/2014 | Chang | ................... | G06F 3/0488 |
| | | | | 715/769 |
| 2015/0004958 A1 | 1/2015 | Wang | | |
| 2015/0074568 A1* | 3/2015 | Kwon | .............. | H04M 1/72519 |
| | | | | 715/764 |
| 2015/0161643 A1 | 6/2015 | Randell | | |
| 2016/0335746 A1 | 11/2016 | Loke | | |
| 2016/0337580 A1 | 11/2016 | Kwon | | |
| 2017/0126954 A1 | 5/2017 | Bekiares | | |
| 2018/0336543 A1* | 11/2018 | Van Os | ................ | H04L 67/1078 |
| 2020/0007671 A1* | 1/2020 | Engelke | ............. | H04M 1/7253 |
| 2020/0285851 A1* | 9/2020 | Lin | ....................... | G06T 19/006 |
| 2020/0351353 A1* | 11/2020 | Al Majid | ............. | H04L 67/141 |

OTHER PUBLICATIONS

U.S. Office Action issued in grandparent U.S. Appl. No. 14/464,768 dated Jan. 11, 2017.

U.S. Notice of Allowance issued in grandparent U.S. Appl. No. 14/464,768 dated Mar. 27, 2017.

U.S. Notice of Allowance issued in parent U.S. Appl. No. 15/633,215 dated Sep. 18, 2019.

* cited by examiner

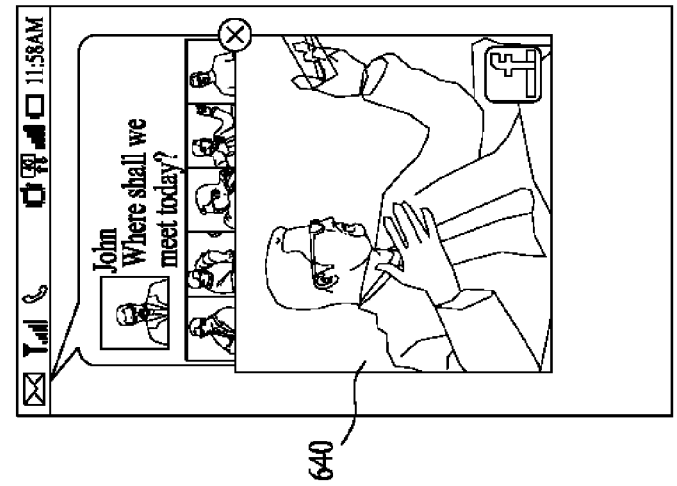
FIG. 6
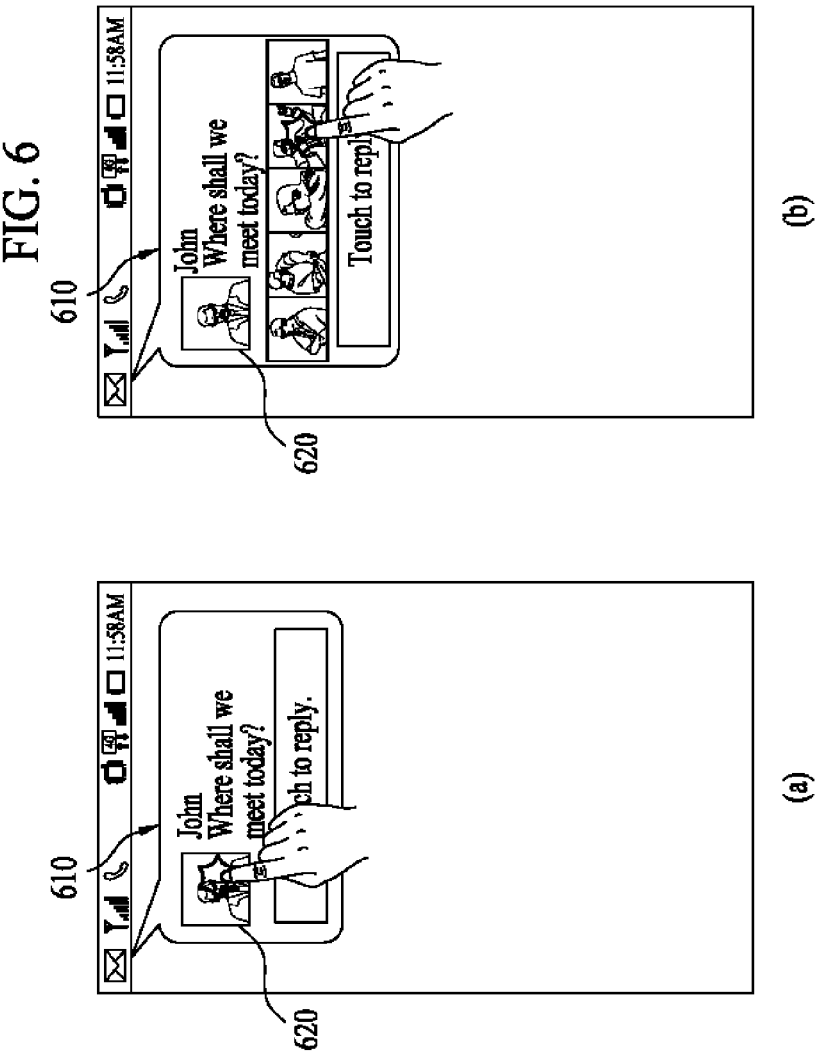

FIG. 11
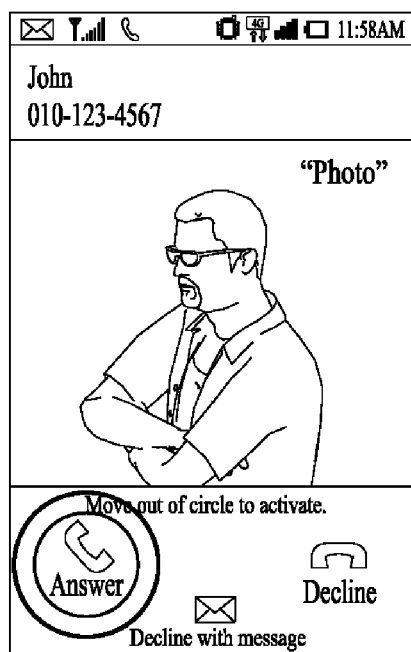
<Vibration mode>
(a)
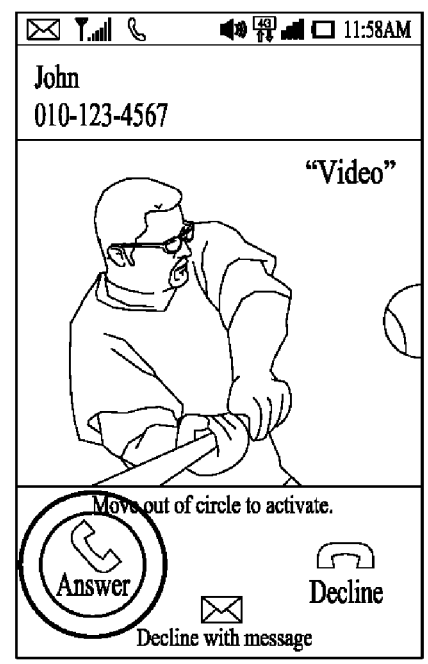
<Sound mode>
(b)

FIG. 12
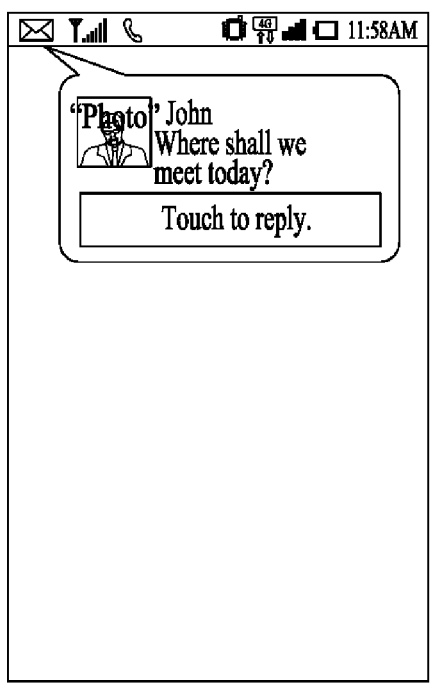
<Text message reception>
(a)
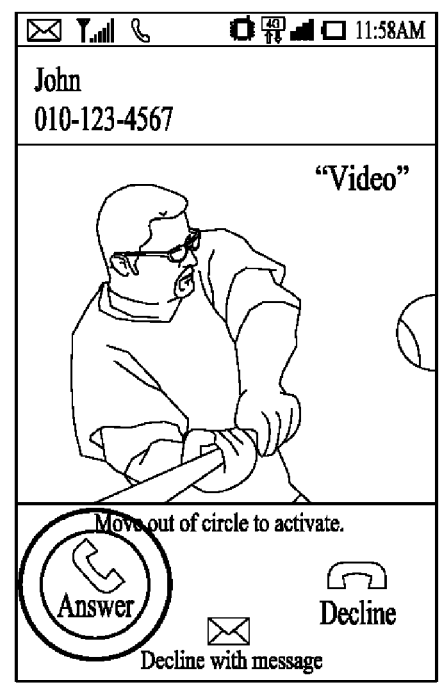
<Incoming Call>
(b)

FIG. 13
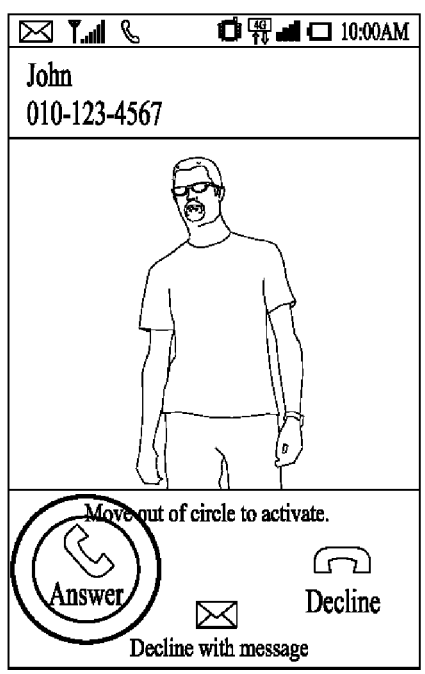
(a)
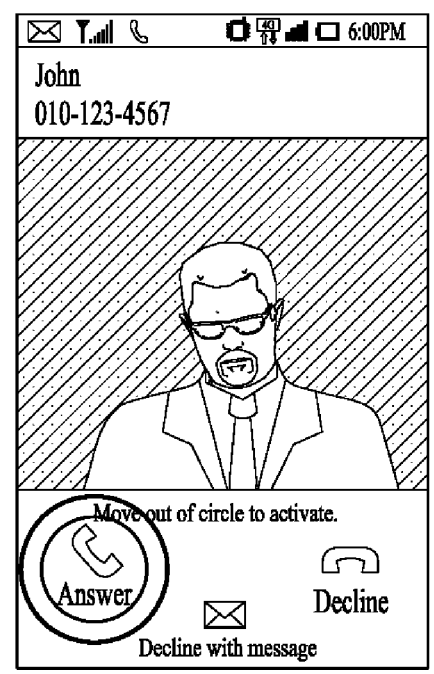
(b)

FIG. 15
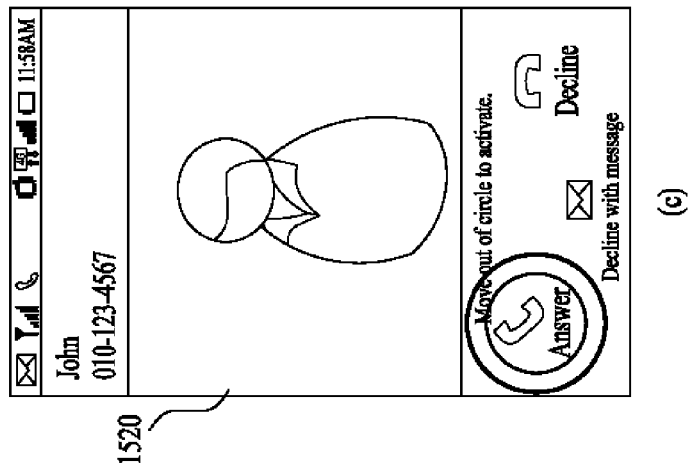
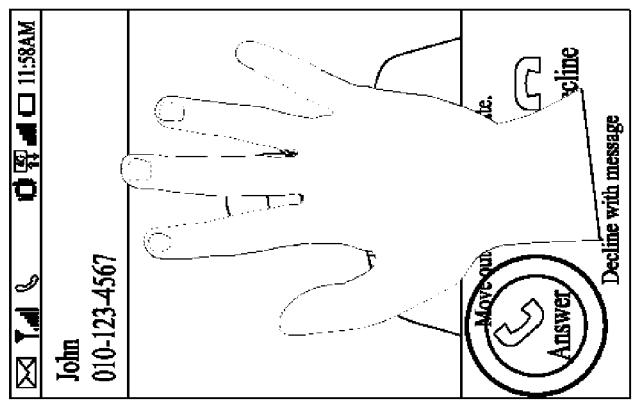
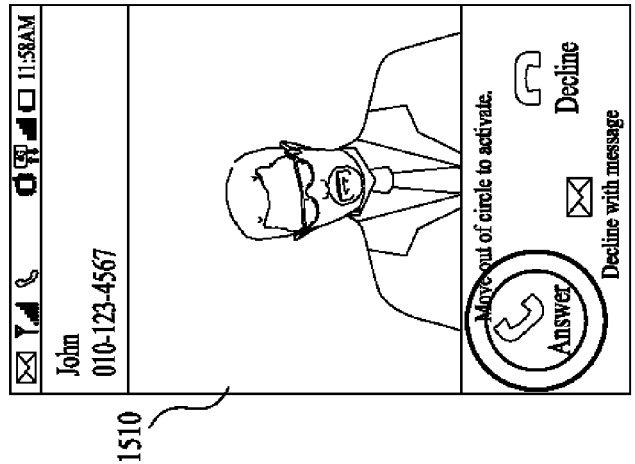

FIG. 18
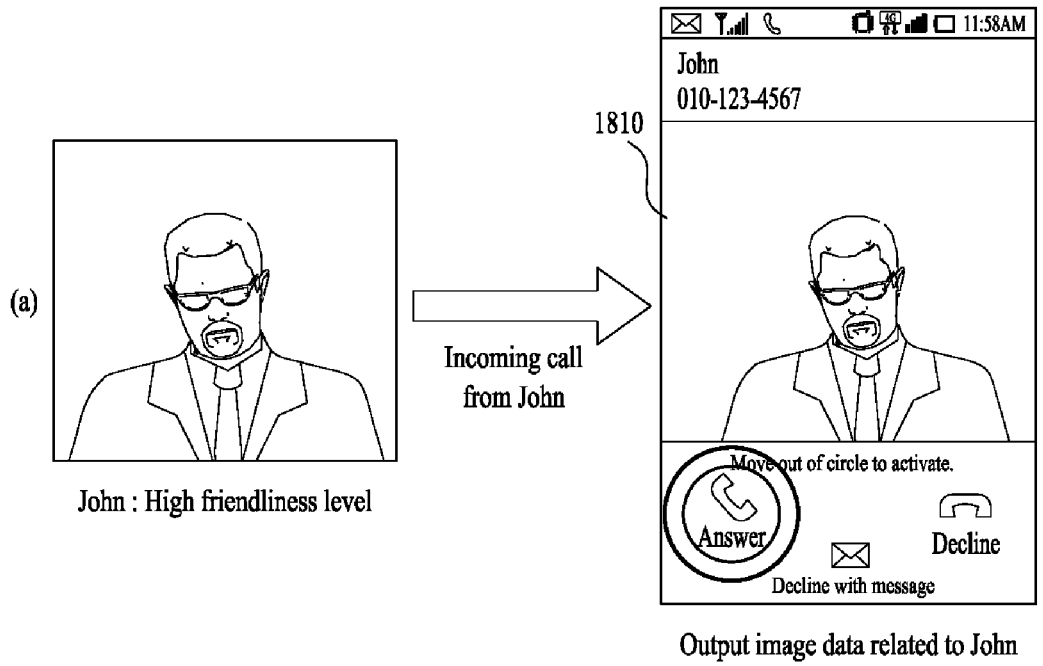
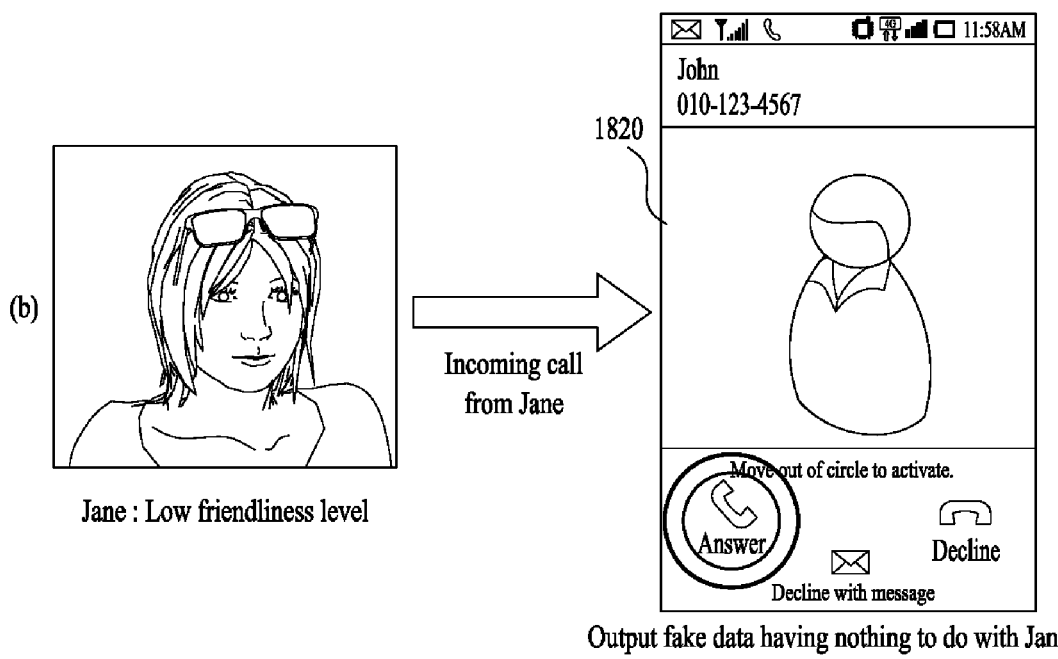

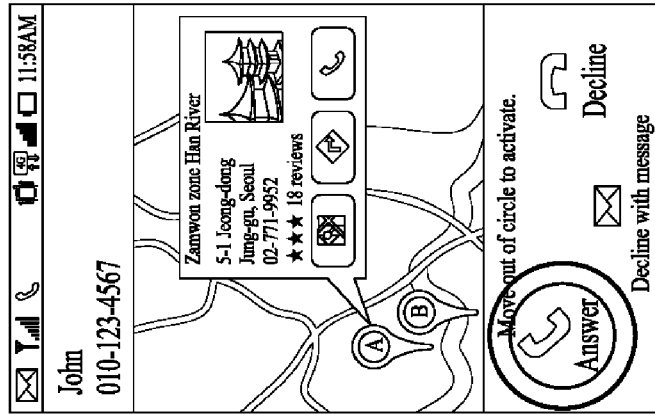
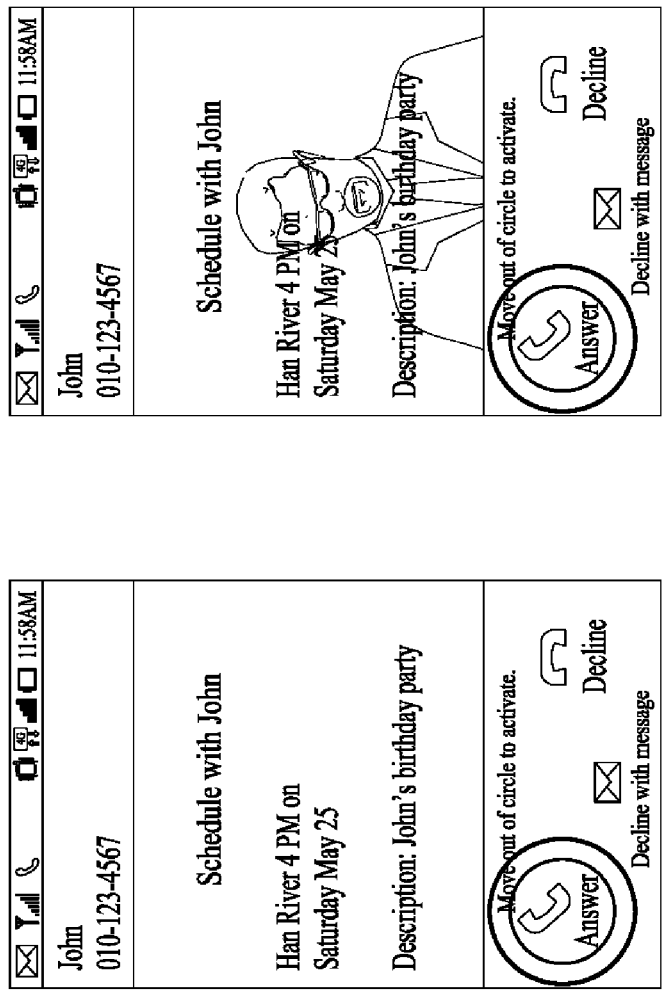
FIG. 19

FIG. 20
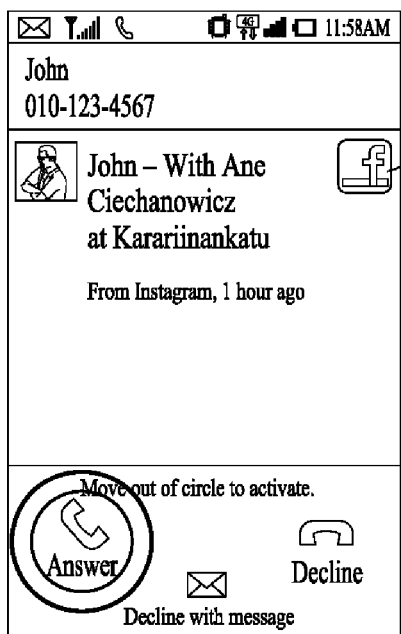
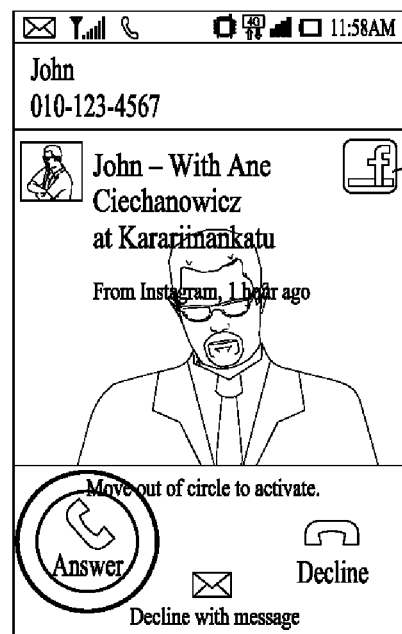
(a)                                    (b)

MOBILE TERMINAL AND CONTROLLING METHOD THEREOF

CROSS-REFERENCE TO RELATED APPLICATIONS

This application is a Continuation Application of U.S. application Ser. No. 15/633,215, filed Jun. 26, 2017, which is a Continuation Application of U.S. patent application Ser. No. 14/464,768, filed Aug. 21, 2014 (now U.S. Pat. No. 9,723,124, issued Aug. 1, 2017), which claims priority under 35 U.S.C. § 119 to Korean Application No. 10-2013-0107930 filed on Sep. 9, 2013, whose entire disclosures are hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for automatically outputting an image of a counterpart having an occurrence of an event.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

When a mobile terminal receives a text message or has an incoming call, the mobile terminal is able to output an information on the received text message or an information on the counterpart of the incoming call together with such feedback as vibration, sound and the like. In doing so, if a text message is sent or a profile photo of the counterpart of the incoming call is registered in a phonebook, the profile photo of the counterpart can be displayed on the mobile terminal as well.

Thus, in order to output a profile photo of a counterpart of an incoming call or a profile photo of a counterpart having sent a text message in response to each incoming call or a reception of a text message, the profile photo of the corresponding counterpart should be registered in a phonebook in advance.

However, in order to register a profile photo of a counterpart in a phonebook, there is limitation such that a photo of the counterpart should be saved in a mobile terminal. And, it is inconvenient for a user to select the profile photo of the counterpart from images saved in the mobile terminal. Moreover, if there are many counterparts registered in a phonebook, it requires persistent efforts to register profile photos of all counterparts. Due to the above-mentioned inconvenience and difficulty, it frequently happens that profile photos are not registered in a mobile terminal mostly.

Furthermore, even if a profile photo of a counterpart is registered, since the number of a profile photo registrable is 1, the same photo of the counterpart is outputted despite multiple occurrences of events. Thus, a user is forced to view the same counterpart photo every time.

BRIEF DESCRIPTION OF THE DRAWINGS

The embodiments will be described in detail with reference to the following drawings in which like reference numerals refer to like elements wherein:

FIG. 6 is a diagram to describe one example of displaying an image data list;

FIG. 11 is a diagram for one example of adjusting a type of an image data related to a prescribed counterpart depending on a setup value of a mobile terminal;

FIG. 12 is a diagram for one example of adjusting a type of an image data related to a prescribed counterpart depending on a type of an occurring event;

FIG. 13 is a diagram for one example of outputting a different image data per time slot;

FIG. 15 is a diagram for another example of outputting a fake data;

FIG. 18 is a diagram to describe an output of a display unit depending on a level of friendliness with a counterpart; and FIG. 19 and FIG. 20 are diagrams to describe examples of outputting supplementary data.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
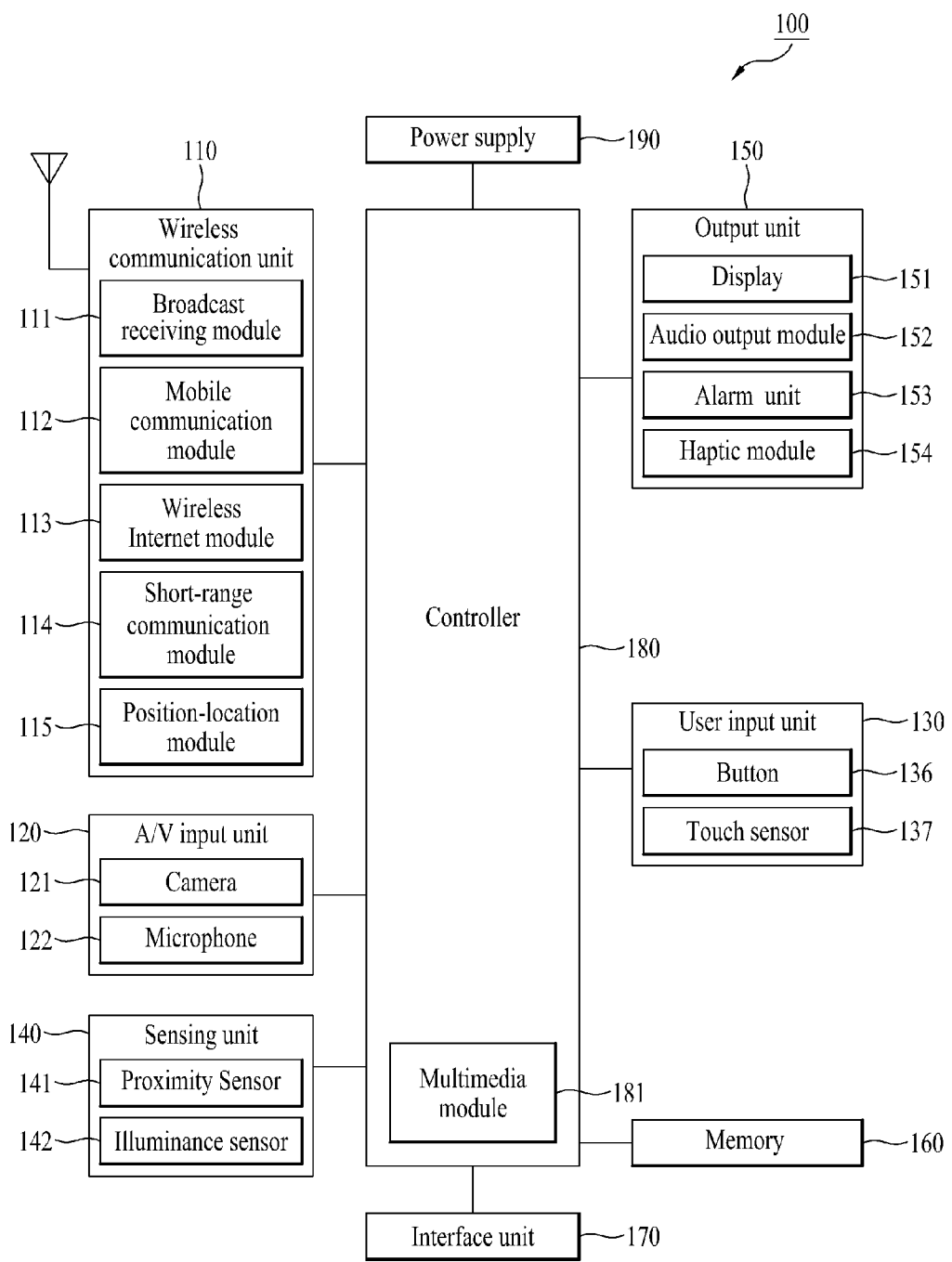
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite.

Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
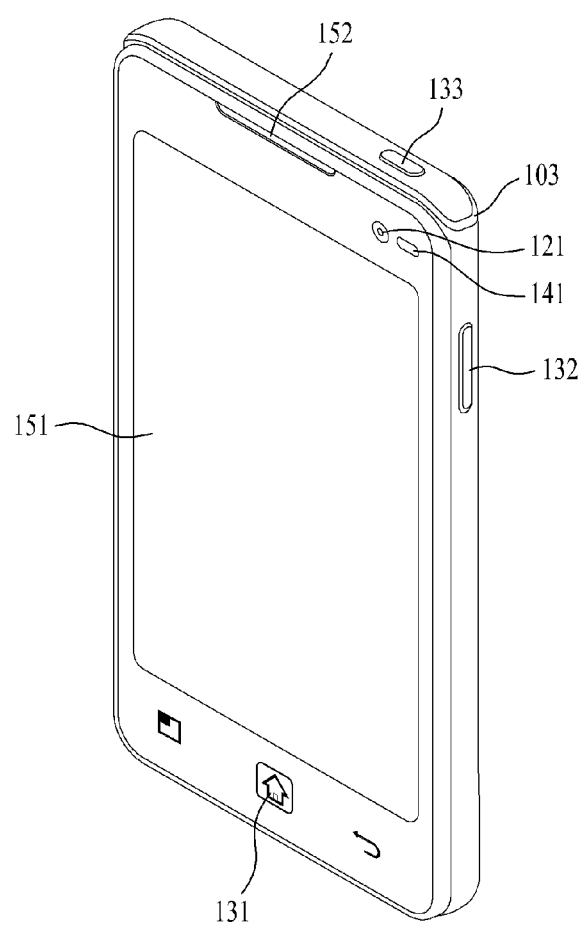
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
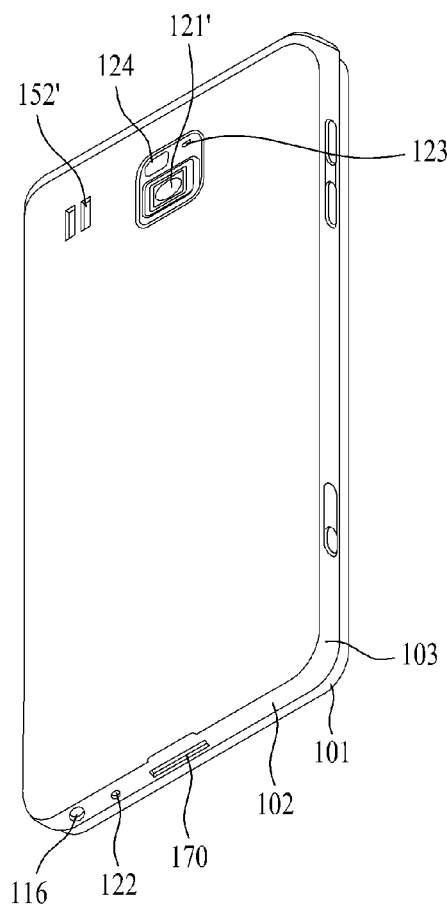
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal according to the present invention includes at least one of the components shown in FIG. 1. In particular, assume that the mobile terminal according to the present invention includes the wireless communication unit 110, the display unit 151, the memory 160 and the controller 180.

If the display module or unit 151 is implemented with a touchscreen, the display unit 151 can play both a role as an output device and a role as an input device to facilitate the implementation of the mobile terminal according to the present invention. Therefore, assume that the display unit 151 in the following embodiments may include the touchscreen.

For clarity, according to embodiments mentioned in the following description, a person intending to use the mobile terminal according to the present invention shall be named a user. And, a person (or a mobile terminal of the corresponding person) intending to communicate (e.g., to exchange phone calls, text messages, instant messages, emails, etc.) with the mobile terminal according to the present invention shall be named a counterpart (or a counterpart terminal).

In the following description, a mobile terminal 100 according to the present invention is explained in detail with reference to FIG. 4.

Figure 4:
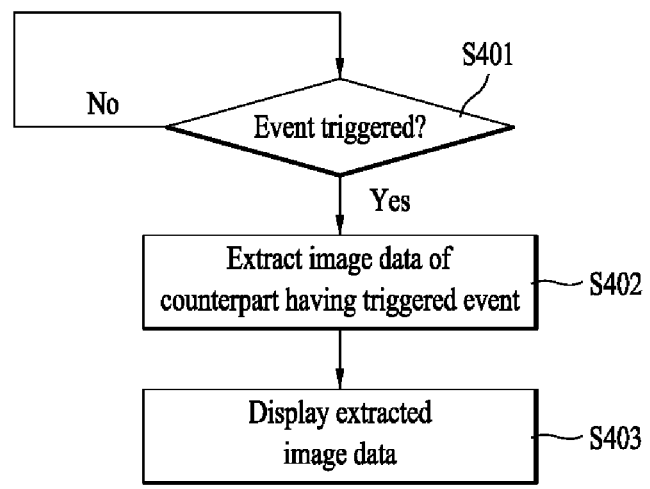
FIG. 4 is a flowchart for an operation of a mobile terminal according to the present invention.

FIG. 4 is a flowchart for an operation of a mobile terminal according to the present invention.

Referring to FIG. 4, if it is determined that an event has been triggered by a prescribed counterpart [S401], the controller 180 extracts an image data related to the prescribed counterpart having triggered the event so that the extracted image data will be outputted through the display unit 151 [S402].

In this case, the event, which can be triggered by the prescribed counterpart, may include one of a case that an incoming call is received from the prescribed counterpart, a case that a message (e.g., a text message, an instant message, etc.) is received from the prescribed counterpart, a case that the prescribed counterpart registers a reply to a posting at an SNS (social network service) account of a user, a case that the prescribed counterpart sends an email to an email account of a user, a case that a direct communication connection request (e.g., a Wi-Fi Direct connection request, a Bluetooth paring request, etc.) is received from the prescribed counterpart, a case that a request for a data sharing (e.g., Miracast, a file sharing, etc.) is received from the prescribed counterpart, and the like.

And, the image data related to the prescribed counterpart may include at least one of a photo/video containing the prescribed counterpart and a photo/video having a prescribed counterpart's identification information tagged as a metadata. The controller 180 may be able to extract the image data related to the prescribed counterpart from a photo or video saved in the memory 160 of the mobile terminal. And, the controller 180 may be able to extract the image data related to the prescribed counterpart from an external server (e.g., an SNS server, a messenger server, other photo management servers (e.g., an album management server), etc.).

After the controller 180 has primarily extracted the image data related to the prescribed counterpart from the memory 160, if the controller 180 is unable to further extract image data related to the prescribed counterpart from the memory 160, the number of the extracted image data is equal to or smaller than a prescribed number, or the mobile terminal is set to extract the image data related to the prescribed counterpart from the external server, the controller 180 may be able to extract image data related to the prescribed counterpart secondarily. For another instance, the controller 180 is able to attempt to extract image data related to the prescribed counterpart from both of the memory 180 and the external server irrespective of a presence or non-presence of extraction of image data from the memory 160.

In extracting the image data related to the prescribed counterpart, the controller 180 can extract the image data related to the prescribed counterpart by checking whether a photo saved in the memory 160 or the external server is tagged with an identification information of the prescribed counterpart. Alternatively, the control 180 can extract an image data of a photographed character regarded as the same person of the prescribed counterpart using a face recognition algorithm. In this case, the identification information of the prescribed counterpart may include at least one of a name of a counterpart registered in a phonebook, an ID (or nickname) of a counterpart registered in a messenger server, an ID (or nickname) of a counterpart registered in an SNS server, and the like. And, a prescribed counterpart's photo corresponding to a reference for applying the face recognition algorithm may include at least one of a profile photo of a prescribed counterpart registered in the phonebook, a profile photo of a prescribed counterpart registered at a messenger account, a profile photo of a prescribed counterpart registered at an SNS account, and the like. In doing so, if there exists the profile photo of the prescribed counterpart registered in the phonebook, the controller 180 firstly extracts the image data related to the prescribed counterpart using the profile photo of the prescribed counterpart registered in the phonebook. Subsequently, if the profile photo of the prescribed counterpart is unregistered in the phonebook or the controller 180 is unable to extract the image data related to the prescribed counterpart as the profile photo registered in the phonebook, the controller 180 can attempt to extract the image data related to the prescribed counterpart using the profile photo registered in the external server (e.g., a messenger server, an SNS server, etc.) for the first time.

Once the image data related to the prescribed counterpart having triggered the event is extracted, the controller 180 is able to control the image data related to the prescribed counterpart to be outputted through at least one partial region of the display_unit 151 in order to announce that the corresponding event has occurred [S403].

Figure 5:
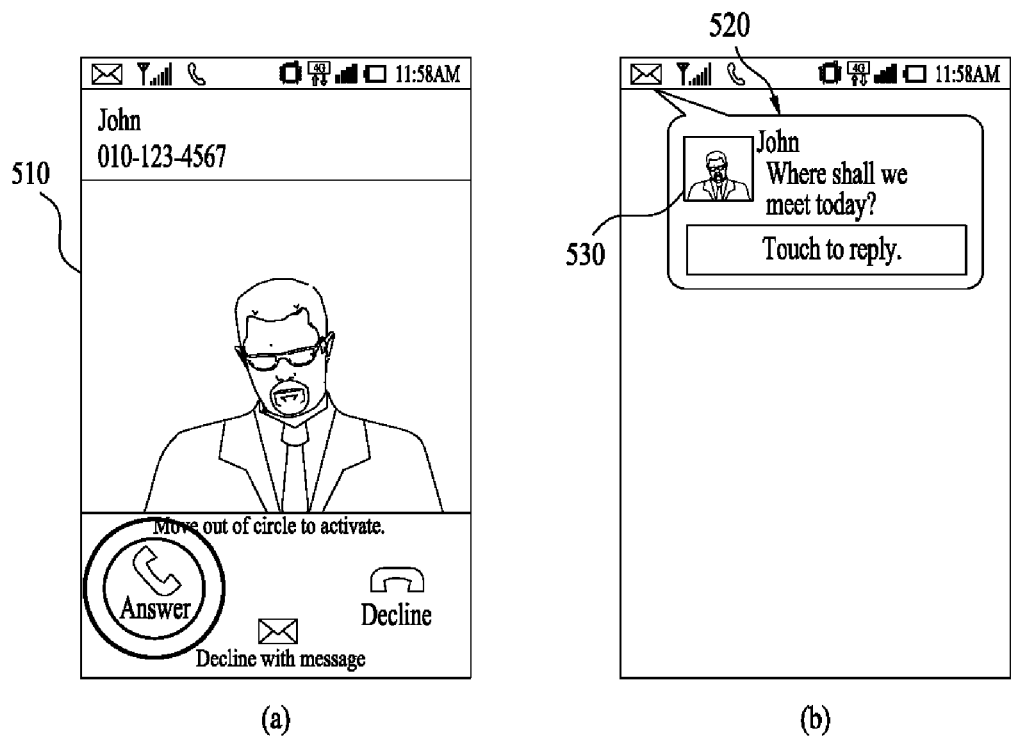
FIG. 5 is a diagram to describe one example of outputting an image data related to a prescribed counterpart to a display unit in response to an occurrence of an event.

FIG. 5 is a diagram to describe one example of outputting an image data related to a prescribed counterpart to the display unit 151 in response to an occurrence of an event.

FIG. 5(a) is a diagram for one example of an output of a mobile terminal when a prescribed counterpart makes a phone call. If a prescribed counterpart makes a phone call, the controller 180 is able to extract an image data related to the prescribed counterpart making the phone call. In particular, as mentioned in the foregoing description, the controller 180 is able to extract a photo/video containing the prescribed counterpart therein or a photo/video tagged with information of the prescribed counterpart as the image data related to the prescribed counterpart. Once the image data related to the prescribed counterpart is extracted, like the example shown in FIG. 5(a), the controller 180 is able to control the extracted image data 510 related to the prescribed counterpart to be displayed on a call connecting screen. FIG. 5(a) shows one example that the image data 510 is displayed through a partial region (e.g., a middle part of the screen) of the call connecting screen. Instead, the image data can be outputted as a background of the call connecting screen.

FIG. 5(b) is a diagram for one example of an output of a mobile terminal when a message is received from a prescribed counterpart. If a message is received from a prescribed counterpart, the controller 180 is able to extract an image data related to the prescribed counterpart having sent the message. Once the image data related to the prescribed counterpart is extracted, like the example shown in FIG. 5(b), the controller 180 is able to control the extracted image data 530 related to the prescribed counterpart to be displayed on a popup window 520 announcing the reception of the message. FIG. 5(b) shows one example that the image data 530 is displayed through a partial region of the popup window 520. Instead, the image data 530 can be outputted as a background of the popup window 520.

Like the examples shown in FIG. 5(a) and FIG. 5(b), in case that an event is triggered by a prescribed counterpart, the controller 180 controls image data related to the prescribed counterpart to be outputted, thereby providing information on the counterpart having triggered the event to a user. In doing so, the displayed image data may include an exact original copy or a preview (e.g., a thumbnail, etc.).

If the image data related to the prescribed counterpart is touched, the controller 180 can control a list of the image data related to the prescribed counterpart to be displayed. One example of displaying the image data list is described in detail with reference to FIG. 6 as follows.

FIG. 6 is a diagram to describe one example of displaying an image data list. For clarity of the following description, assume that a popup window 610 for announcing that a message has been received from a prescribed counterpart is currently displayed on the display unit 151.

Referring to FIG. 6, if an image data 620 of a prescribed counterpart currently outputted through a popup window 610 is touched [FIG. 6(a)], the controller 180 is able to control an image data list 630 related to the prescribed counterpart to be displayed [FIG. 6(b)]. In this case, previews (e.g., thumbnails) of a plurality of collected image data can be displayed on the image data list 630. When the prescribed counterpart and the image data list 630 are displayed, the controller 180 can sort the image data by a prescribed reference. In this case, the reference for sorting the image data may include one of an image data created date, a lately inquired date of image data, a play (or inquiry) count of image data and the like.

If a prescribed image data is selected from the image data list 630, referring to FIG. 6(c), the controller 180 is able to control the selected image data (i.e., an original copy 640 of the selected image data) to be displayed.

Like the example shown in FIG. 6, as an image data related to a prescribed counterpart is displayed, a user is able to check a multitude of image data related to the prescribed counterpart conveniently and easily.

When an image data related to a prescribed counterpart is displayed, the controller 180 can control a location information of the displayed image data to be displayed as well. In this case, the location information may means a location at which the image data is saved. Hence, a user is able to determine where a currently displayed image data is saved through the location information conveniently and easily.

Figure 7:
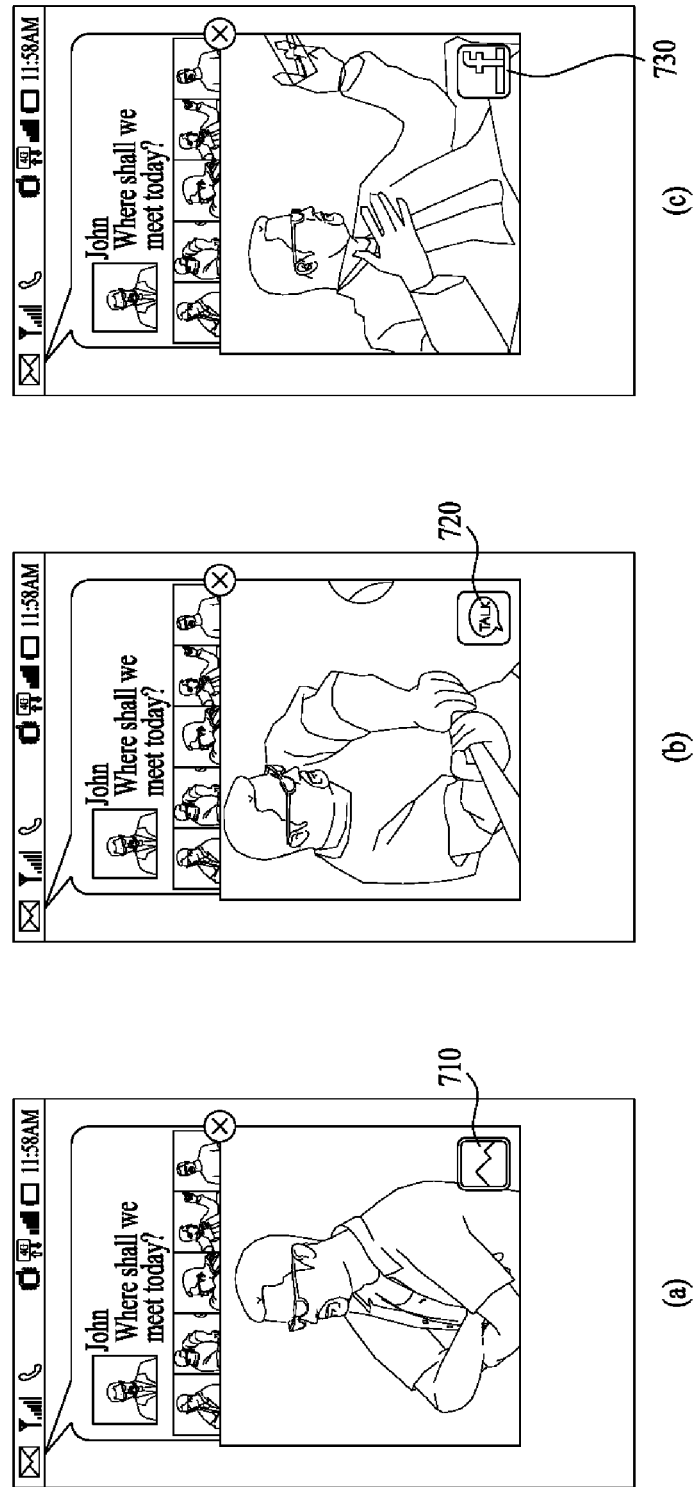
FIG. 7 is a diagram to describe one example of displaying location information.

For instance, FIG. 7 is a diagram to describe one example of displaying location information. Like the examples shown in FIGS. 7(a) to 7(c), the controller 180 can control an object (e.g., an icon, an indicator, etc.) 710/720/730, which indicates a saved location of an image data, to be displayed on the corresponding image data. FIG. 7(a) shows one example that the object 710 indicating that an image data related to a prescribed counterpart has been extracted from the memory 160 of the mobile terminal. FIG. 7(b) shows one example that the object 720 indicating that an image data related to a prescribed counterpart has been extracted from a messenger server. And, FIG. 7(c) shows one example that the object 730 indicating that an image data related to a prescribed counterpart has been extracted from an SNS server.

An address of an access to a location having an image data saved thereat may be linked to an object indicating a location information of the image data related to a prescribed counterpart. Hence, if receiving a user input for selecting (e.g., touching) the object indicating the location information, the controller 180 can attempt an access to the image data saved location. For instance, if receiving a user input of touching an object indicating that an image data is saved in the memory 160, the controller 180 activates a gallery application so as to control an image data list saved in the memory 160 to be displayed. Moreover, if receiving a user input of touching an object indicating that an image data has been extracted from an external server such as a messenger server, an SNS server and the like, the controller 180 can access an account of a prescribed counterpart in the external server (e.g., the messenger server in FIG. 7(b), the SNS server in FIG. 7(c), etc.).

In particular, an image data saved location can be indicated through a location information and a user can be provided with facilitation of a quick access to the image data saved location.

The mobile terminal according to the present invention can control image data related to a counterpart to be displayed in case of an occurrence of an event. And, the mobile terminal according to the present invention is also able to control image data related to a counterpart to be displayed when an event occurrence list is displayed to check an occurring event. In this case, the event occurrence list may include such a list for checking an event occurring in the mobile terminal as a phonebook list, a transceived text message list, a call list, an absent call list, a counterpart list (i.e., a friend list) of a user's messenger account (i.e., an account registered in a messenger server), a transceived instant message list, a counterpart list (e.g., a friend list) of a user's SNS account (i.e., an account registered in an SNS server), a counterpart list of counterparts available for short-range communication establishments, and the like.

An embodiment of outputting an image data of a counterpart to an event occurrence list is described in detail with reference to FIG. 8 as follows.

Figure 8:
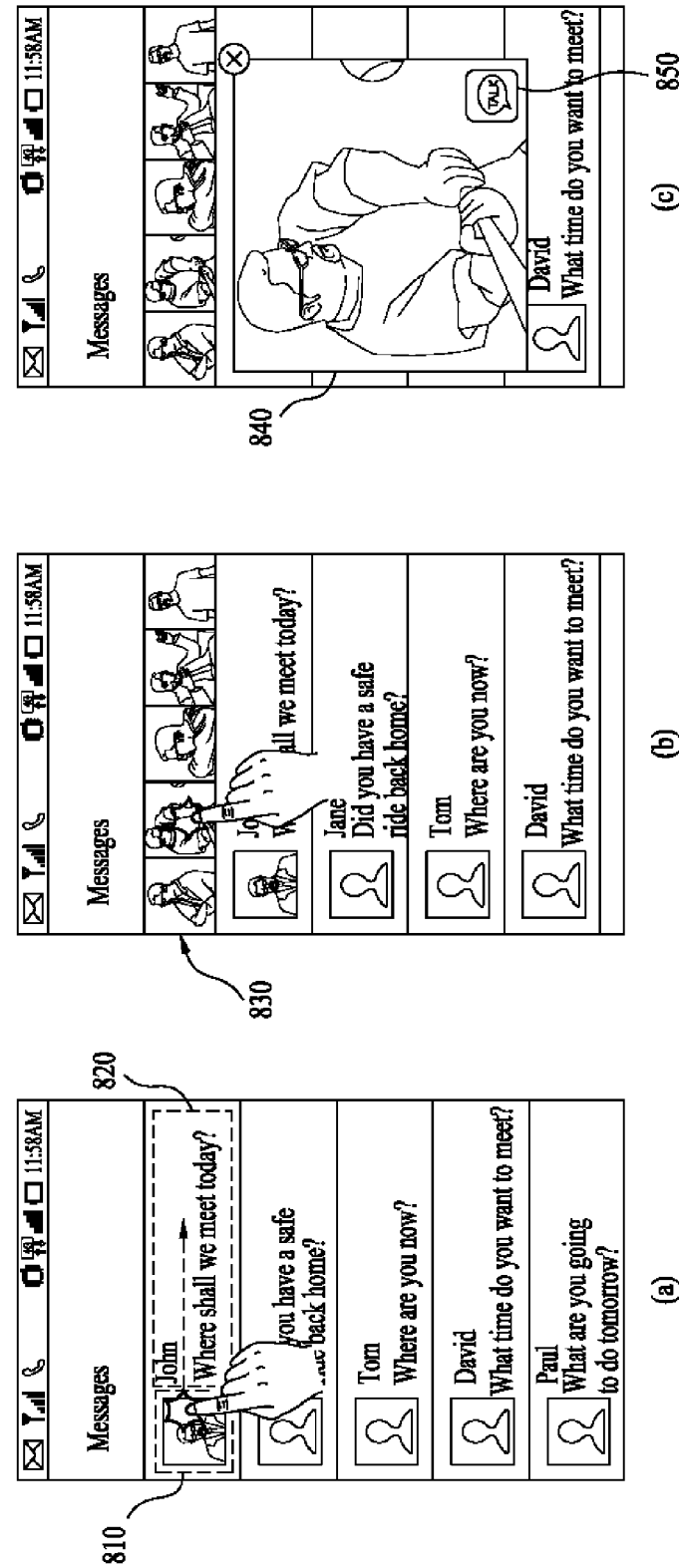
FIG. 8 is a diagram to describe one example of outputting an image data of a counterpart to an event occurrence list.

FIG. 8 is a diagram to describe one example of outputting an image data of a counterpart to an event occurrence list.

Referring to FIG. 8, an event occurrence content per counterpart can be displayed on an event occurrence list. In this case, a per-counterpart display region may include a first region 810 for outputting an image data related to a counterpart and a second region 820 for displaying information of the counterpart. In particular, the counterpart information outputted through the second region 820 may include a name of the counterpart, a nickname of the counterpart, an ID (e.g., an ID for using an instant messenger, an ID for using an SNS service, etc.) of the counterpart, a phone number of the counterpart of an incoming call, a content of a message or email recently transceived with the counterpart, a content of a posting written by the counterpart on an SNS account of his own, and the like. In the example shown in FIG. 8, a name of the counterpart and a content of a message most recently transceived with the counterpart are displayed on the second region 820.

Like the example shown in FIG. 8(a), the image data related to the counterpart can be outputted through the first region 810. Hence, a user is able to check image data related to a prescribed counterpart through the image data displayed on the first region 810.

The controller 180 is able to control each image data to be outputted for every counterpart disclosed on the event occurrence list. For another instance, the controller 180 can control image data to be displayed in a manner as follows. First of all, the controller 180 sorts out counterparts into a profile photo registered counterpart and a profile photo unregistered counterpart. Secondly, the controller 180 displays a profile photo of the photo registered counterpart. The controller 180 extracts an image data of the profile photo unregistered counterpart and then displays the extracted image data. For further instance, the controller 180 only performs an image data extracting process on a counterpart having triggered a new event and then controls the extracted image data to be displayed.

If a touch input to the first region 810 is received (e.g., in FIG. 8(*a*), a touch input is received in a manner of moving a pointer in a specific direction from the first region 810 of a prescribed counterpart), the controller 180 can control an image data list 830 of the selected counterpart to be displayed [FIG. 8(*b*)]. In this case, thumbnail images (or preview images) of the collected image data can be displayed on the image data list 830. In doing so, the controller 180 may control the image data list 830 to be displayed at a location adjacent to a display region of the corresponding counterpart in the counterpart list. Alternatively, like the example shown in FIG. 8(*b*), the controller 180 pushes out a display region of the selected counterpart in a prescribed direction and then controls the image data list 830 to be displayed at the former location of the display region of the selected counterpart.

If a prescribed image data is selected from the image data list 830, referring to FIG. 8(*c*), the controller 180 can control the selected image data (e.g., an original copy 840 of the selected image data, etc.) to be displayed.

When the image data is displayed, as mentioned in the foregoing description, the controller 180 can display an object 850 indicating a location information of the displayed image data as well.

If a specific counterpart is selected from an event occurrence list, the controller 180 can details of an occurring event. For instance, if a prescribed counterpart is selected from a transceived text message list shown in FIG. 8(*a*) referring to FIG. 9(*a*) the controller 180 can control contents of text messages transceived with the selected counterpart to be outputted. In doing so, the controller 180 can assign at least one partial region of the display unit 151 as a region through which an image data 910 related to the counterpart will be outputted. In particular, referring to FIG. 9(*a*), the image data 910 is outputted through a left top end of the display unit 151.

Figure 9:
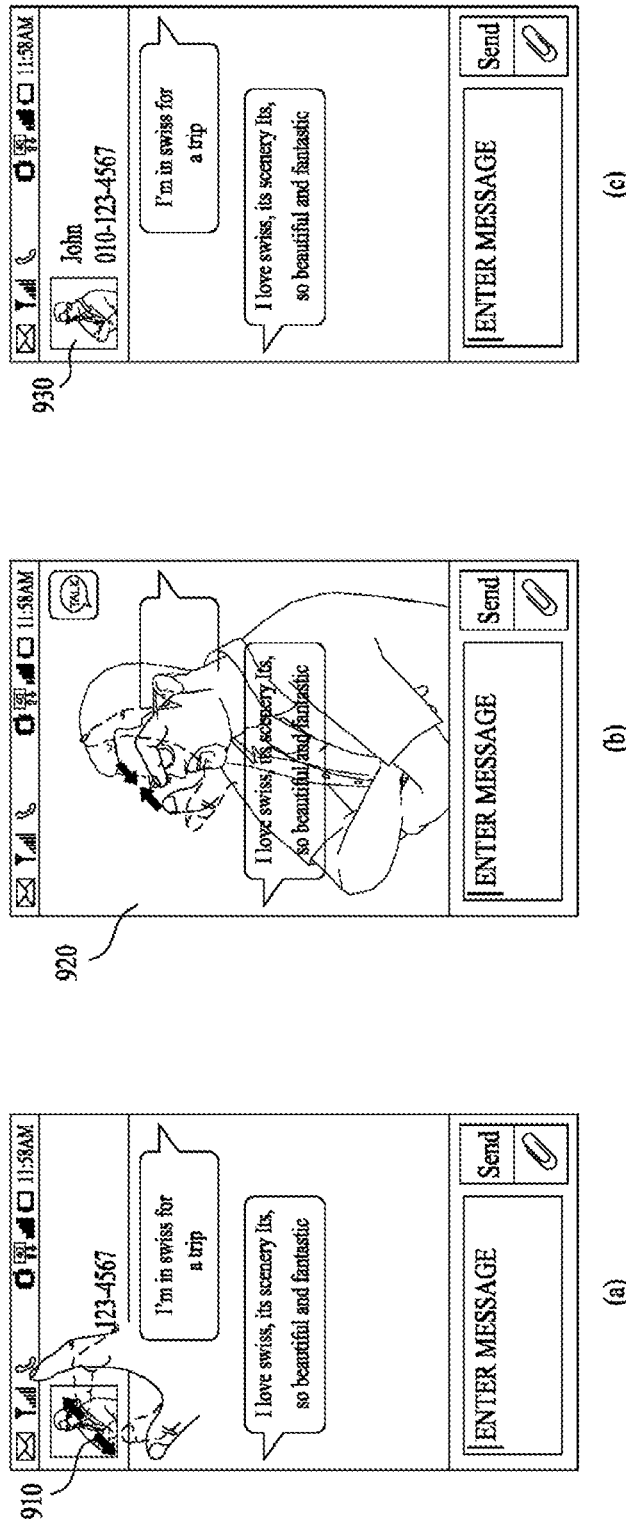
FIG. 9 is a diagram to describe one example of setting an image data as a background in case of checking event details.

In doing so, while the details of the event are displayed, if a prescribed user input is applied to the image data 910 (e.g., in the example shown in FIG. 9(*a*), a pinch-out input is applied to the image data 910), like the example shown in FIG. 9(*b*), the controller 180 can control the details of the event to be set as a background 920 of a display screen. In this case, the details of the event (e.g., messages transceived with the counterpart, etc.) can be semi-transparently outputted over the image data 920 set as the background.

Thereafter, if a prescribed user input is applied to the image data 920 set as the background (e.g., in the example shown in FIG. 9(*b*), a pinch-in input is applied to the image data 920 set as the background), referring to FIG. 9(*c*), the controller 180 can control the image data 910 to be outputted through the originally assigned region.

Like the examples shown in FIGS. 4 to 9, the mobile terminal according to the present invention can output image data related to a counterpart having triggered an event irrespective of a presence or non-presence of registration of a profile photo of the counterpart. In particular, although a user fails to register a profile photo per counterpart in a phonebook or the like, an image data related to a counterpart can be outputted.

According to another embodiment, in FIG. 4, the steps S402 and S403 of extracting the image data related to the prescribed counterpart having triggered the event can be performed on the condition that a profile photo of the prescribed counterpart is not registered. In particular, if the profile photo of the counterpart having triggered event is already registered (e.g., the profile photo is registered in the phonebook), the controller 180 outputs the previously registered profile photo instead of extracting the image data related to the prescribed counterpart. If the profile photo of the counterpart having triggered the event is not registered, the controller 180 attempts to extract the image data related to the prescribed counterpart and is then able to control the extracted image data to be outputted. In doing so, the controller 180 is able to control the extracted image data to be automatically registered as the profile photo of the prescribed counterpart having triggered the event. In particular, if the image data related to the prescribed counterpart, of which profile photo is unregistered, is extracted, the controller 180 may control the extracted image data to be automatically set as the profile photo of the prescribed counterpart.

Based on the above descriptions, various embodiments performed by the mobile terminal of the present invention shall be described in detail as follows.

<Outputting New Image Data on Each Occurrence of Event>

If a plurality of image data of a prescribed counterpart exist, the controller 180 can control a new image data to be outputted each time an event is triggered by the prescribed counterpart. For instance, the controller 180 can control a plurality of the image data to be sequentially outputted by a prescribed reference. For another instance, the controller 180 can control a prescribed image data, which is randomly selected from a plurality of the image data, to be outputted. In this case, a reference for sorting the image data may include one of an image data created date, a date of a most recently inquiry of the image data, a count of inquiry (or play) of the image data, and the like.

Figure 10:
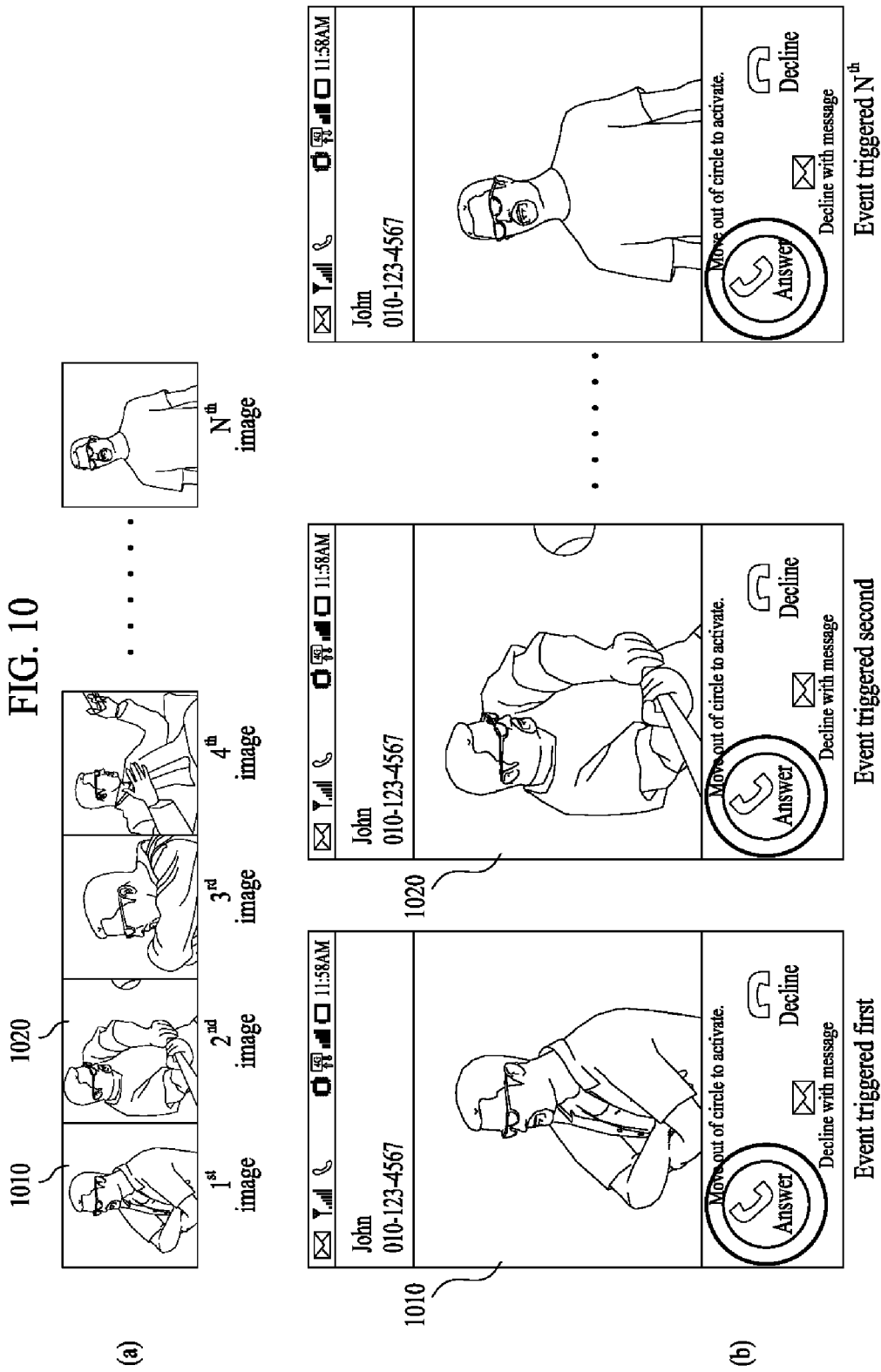
FIG. 10 is a diagram for one example of outputting a new image data in response to each occurrence of an event by a prescribed counterpart.

For instance, FIG. 10 is a diagram for one example of outputting a new image data in response to each occurrence of an event triggered by a prescribed counterpart. FIG. 10(*a*) shows one example of sorting a plurality of image data of a prescribed counterpart by a prescribed reference. And, FIG. 10(*b*) is a diagram for one example of an output of a mobile terminal when an event is triggered by a prescribed counterpart. Referring to FIG. 10(*a*) and FIG. 10(*b*), the controller 180 can control new image data to be sequentially outputted each time an event is triggered by a prescribed counterpart. For instance, if a first event is triggered by a prescribed counterpart, the controller 180 controls a first image data 1010 among a plurality of image data related to the prescribed counterpart to be outputted. If a second event is triggered by the prescribed counterpart, the controller 180 controls a second image data 1020 among a plurality of the image data to be outputted. Thus, the controller 180 is able to control a new image data to be outputted each time an event occurs.

The controller 180 may apply a different sorting reference depending on the number of image data. In particular, if the number of image data related to a prescribed counterpart is equal to or smaller than N, the controller 180 applies a first sorting reference. If the number of image data related to a prescribed counterpart is greater than N, the controller 180 applies a second sorting reference. Thus, the controller 180 can determine the image data to output sequentially. For instance, if the first sorting reference is a photographed order of the image data and the second sorting reference is an inquired order of the image data, when the number of image data is not considerable (i.e., equal to or smaller than N), the image data are firstly outputted in the photographed time order. If the number of the image data becomes considerable, the image data can be outputted in order of the image data most frequently inquired by a user.

According to another embodiment, if an event is triggered by a prescribed counterpart, the controller 180 can control a prescribed image data, which is selected from a plurality of image data related to the prescribed counterpart, to be outputted. In doing so, in order to prevent the same image data to be consecutively outputted, the controller 180 may be able to randomly select a prescribed image data from the rest of the image data except a most recently outputted image data.

According to another embodiment, the controller 180 can control a latest image data (e.g., a most recently created image data, a most recently updated image data, etc.), which is selected from a plurality of image data of a prescribed counterpart, to be displayed. In particular, although there are a plurality of image data of a prescribed counterpart, the controller controls a latest image data to be displayed, thereby enabling a user to check a most recent appearance (or look) of the prescribed counterpart.

<Determining Type of Image Data to be Outputted Through Display Unit 151>

The mobile terminal according to the present invention can determine a type of an image data, which is to be outputted through the display unit 151, depending on an operating status of the mobile terminal or a type of an occurring event.

According to one embodiment, while the mobile terminal is operating in vibration mode (i.e., a sound-muted state), the controller 180 can control a photo related to a prescribed counterpart to be displayed in response to an event occurrence. If the mobile terminal is operating in sound mode (i.e., a sound-outputtable state), the controller 180 can control a video related to a prescribed counterpart to be displayed in response to an event occurrence.

FIG. 11 is a diagram for one example of adjusting a type of an image data related to a prescribed counterpart depending on a setup value of a mobile terminal. FIG. 11(*a*) shows one example of a state that a mode of a mobile terminal is set to a vibration mode. And, FIG. 11(*b*) shows one example of a state that a mode of a mobile terminal is set to a sound mode. For clarity of the following description, assume that an occurring event includes an incoming call. While a mode of the mobile terminal is set to a vibration mode, if an incoming call is received from a prescribed counterpart, like the example shown in FIG. 11(*a*), the controller 180 is able to control a photo related to a prescribed counterpart, who has triggered an event, to be outputted. On the other hand, while a mode of the mobile terminal is set to a sound mode, if an incoming call is received from a prescribed counterpart, like the example shown in FIG. 11(*b*), the controller 180 can control a video, which is related to a prescribed counterpart having triggered an event, to be outputted.

In particular, like the examples shown in FIG. 11(*a*) and FIG. 11(*b*), the controller 180 can determine whether to output a photo or video as an image data related to a prescribed counterpart depending on whether the mobile terminal is in a state or mode appropriate for outputting audio or sound.

In case that a video related to a prescribed counterpart is outputted, the controller 180 controls audio data of the video to be outputted instead of a call ringtone or can control a call ringtone to be outputted by omitting an output of audio data of the video (i.e., by outputting video data only). For another instance, the controller 180 can control both a call ringtone and an audio data of a video to be simultaneously outputted. For another instance, depending on an output strength of an audio data of a video, the controller 180 can control an output of the call ringtone to be omitted if the output strength of the audio data is high. If the output strength of the audio data is low, the controller 180 can control the call ringtone to be outputted.

For further instance, depending on a type of an occurring event, the controller 180 can determine a type of an image data. In particular, if an event of a first type is triggered by a prescribed counterpart, the controller 180 can control a photo related to the prescribed counterpart to be displayed in response to an occurrence of the event. If an event of a second type occurs, the controller 180 can control a video related to the prescribed counterpart to be displayed in response to an occurrence of the event.

FIG. 12 is a diagram for one example of adjusting a type of an image data related to a prescribed counterpart depending on a type of an occurring event. For clarity of the following description, assume that an event of a first type is to receive a message (e.g., a text message, an instant message, etc.) from a prescribed counterpart. And, assume that an event of a second type is an incoming call from a prescribed counterpart (i.e., an event that a prescribed counterpart makes a phone call).

Referring to FIG. 12(*a*), if a message is received from a prescribed counterpart, the controller 180 can control a photo of the prescribed counterpart to be outputted through a popup window indicating that the message has been received. On the other hand, referring to FIG. 12(*b*), if there is an inkling call from a prescribed counterpart, the controller 180 can control a video of the prescribed counterpart to be outputted through a call connecting screen.

In particular, like the examples shown in FIG. 12(*a*) and FIG. 12(*b*), the controller 180 is able to determine whether to output a photo or a video as an image data related to a prescribed counterpart depending on a type of an occurring event.

<Determining Image Data to Display in Consideration of Time Slot>

The mobile terminal according to the present invention is able to determine image data, which is to be outputted through the display unit 151, in consideration of a current time. For instance, a current time is discriminated into a daytime or a nighttime. If a current time corresponds to a daytime, an image data of a bright line can be outputted. If a current time corresponds to a nighttime, an image data of a dark line can be outputted. In doing so, it is able to determine whether the image data corresponds to the bright line or the dark line using at least one of brightness, color and chroma of the image data (e.g., photo, video, etc.). For instance, a taken photo or video can be handled as corresponding to a bright line if its brightness value is equal to or greater than a first preset limit. For another instance, a taken photo or video can be handled as corresponding to a dark line if its brightness value is equal to or smaller than a second limit. If chromatic color is dominantly used for a taken photo or video, it can be handled as corresponding to a bright line. If achromatic color is dominantly used for a taken photo or video, it can be handled as corresponding to a dark line. For further instance, a photo or video taken in daytime can be handled as corresponding to a bright line.

FIG. 13 is a diagram for one example of outputting a different image data per time slot. FIG. 13(a) is a diagram for one example of an output in case that a current time corresponds to a daytime. And, FIG. 13(b) is a diagram for one example of an output in case that a current time corresponds to a nighttime. For clarity of the following description, assume that a photo having a shaded background indicates a photo of a dark line. And, assume that a photo not having a shaded background indicates a photo of a bright line.

In case that an event is triggered in the daytime by a prescribed counterpart, referring to FIG. 13(a), the controller 180 can control an image data of a bright line to be outputted. On the other hand, in case that an event is triggered in the nighttime by a prescribed counterpart, referring to FIG. 13(b), the controller 180 can control an image data of a dark line to be outputted.

According to another embodiment, the mobile terminal of the present invention can determine an image data, which is to be outputted per time slot, using a photographing time information in metadata of a photo or video. For instance, if an event occurring time is 1:00 PM, the controller 180 can control an image data, of which photographed time is closest to 1:00 PM, to be outputted.

<Determining Image Data to Display in Consideration of Place>

The mobile terminal according to the present invention is able to control an image data, which is taken at a location closest to a current location of the mobile terminal, to be outputted. In this case, the current location of the mobile terminal may be obtained from the position location module 115. And, the image data taken location can be obtained from a location information with which the image data is tagged.

<Display of Fake Data>

The mobile terminal according to the present invention can display a fake data having nothing to do with a prescribed counterpart instead of displaying an image data related to the prescribed counterpart having triggered the occurrence.

Figure 14:
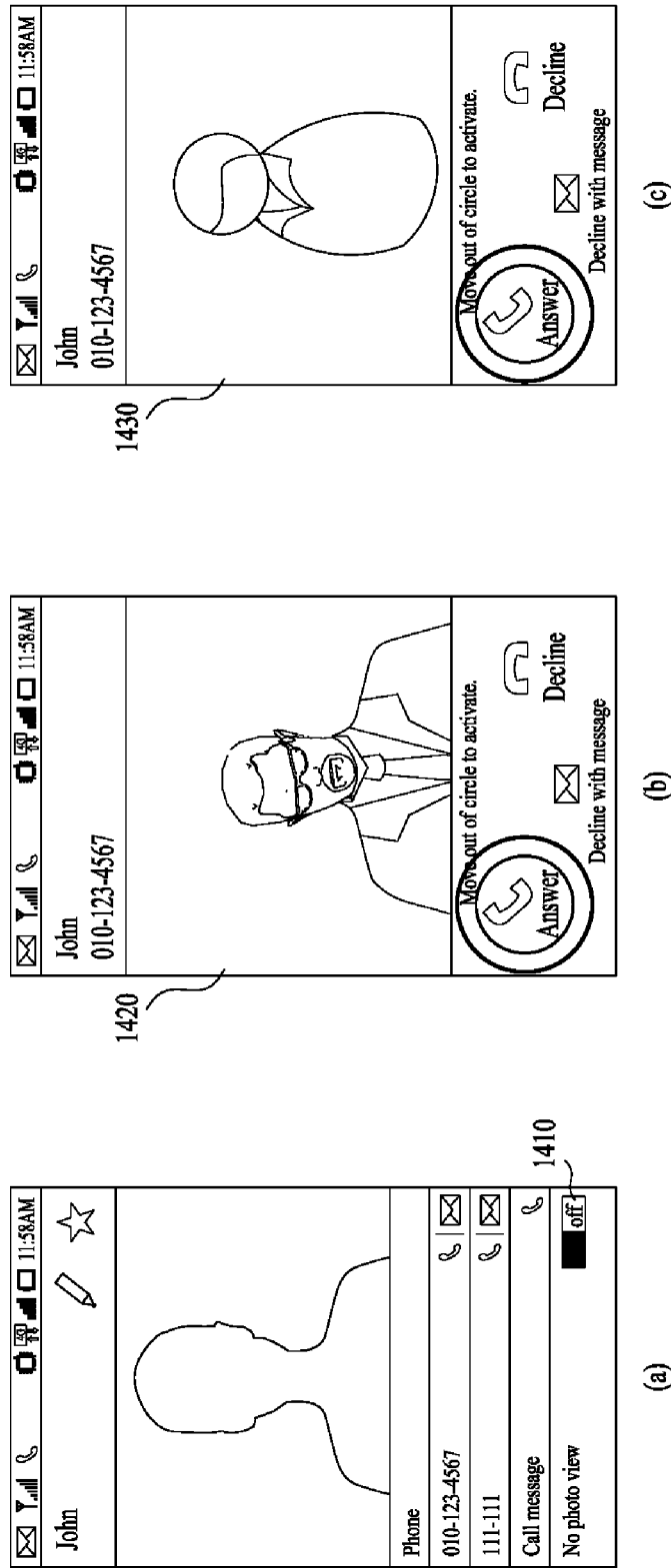
FIG. 14 is a diagram for one example of outputting a fake data.

For instance, FIG. 14 is a diagram for one example of outputting a fake data. FIG. 14(a) shows a screen provided to a user in order to set whether to output an image data related to a prescribed counterpart having triggered an event. FIG. 14(a) and FIG. 14(b) are diagrams for one example of an output through the display unit 151 depending on a setup value.

Referring to FIG. 14, the controller 180 can control a setup value, which indicates whether to output an image data related to a counterpart, to be saved in the memory 160 per counterpart registered in a phonebook. In doing so, in order to adjust the setup value, referring to FIG. 14(a), the controller 180 can control a toggle key 1410, which is provided to adjust the setup value, to be displayed on a detailed screen of the counterpart registered in the phonebook. Based on a user's manipulation on the toggle key 1410, the controller 180 is able to save the setup value per counterpart registered in the phonebook.

In case that an event is triggered by a counterpart set to output an image data, referring to FIG. 14(b), the controller 180 can control an image data 1420, which is related to the counterpart having triggered the event, to be outputted.

On the other hand, if an event is triggered by a counterpart set not to output an image data, referring to FIG. 14(c), the controller 180 can control a fake data 1430 (e.g., an image not related to a counterpart having triggered an event, an emoticon of the counterpart, a video of the counterpart, etc.), which has nothing to do with the counterpart having triggered the event, to be outputted.

While an image data related to a counterpart having triggered an event is outputted, if a user input for blocking the image data related to the counterpart is received from a user, the mobile terminal according to the present invention can control a fake data to be outputted by stopping outputting the image data.

For instance, FIG. 15 is a diagram for another example of outputting a fake data. For clarity of the following description, assume that a user input for blocking an image data may include a palm touch performed in a manner of touching a touchscreen with a palm. Referring to FIG. 15, while an image data 1510 related to a counterpart having triggered an event is outputted, if a user input for blocking the image data 1510 is applied [FIG. 15(a), FIG. 15(b)], the controller 180 can control a fake data 1520 to be outputted instead of the image data 1510 [FIG. 15(c)].

Meanwhile, while the fake data is outputted, if a user input for blocking the fake data is received, the fake data stops being outputted and the image data can be outputted [not shown in the drawing].

For clarity of the description, FIG. 15 shows one example that a touch to a touchscreen with a palm is a user input for blocking an image data. For another instance, an action performed in a manner of zigzagging a pointer touching a touchscreen as if erasing a displayed image data with an eraser can be defined as a user input for switching between an image data and a fake data.

<Outputting Fake Data Depending on Time and Place>

In case that an event is triggered by a prescribed counterpart in a preset time slot or a preset location range, the controller 180 can control a fake data to be outputted instead of an image data related to the prescribed counterpart. On the other hand, in case that an event is triggered by a prescribed counterpart out of a preset time slot or a preset location range, the controller 180 can control an image data related to the prescribed counterpart to be outputted.

Figure 16:
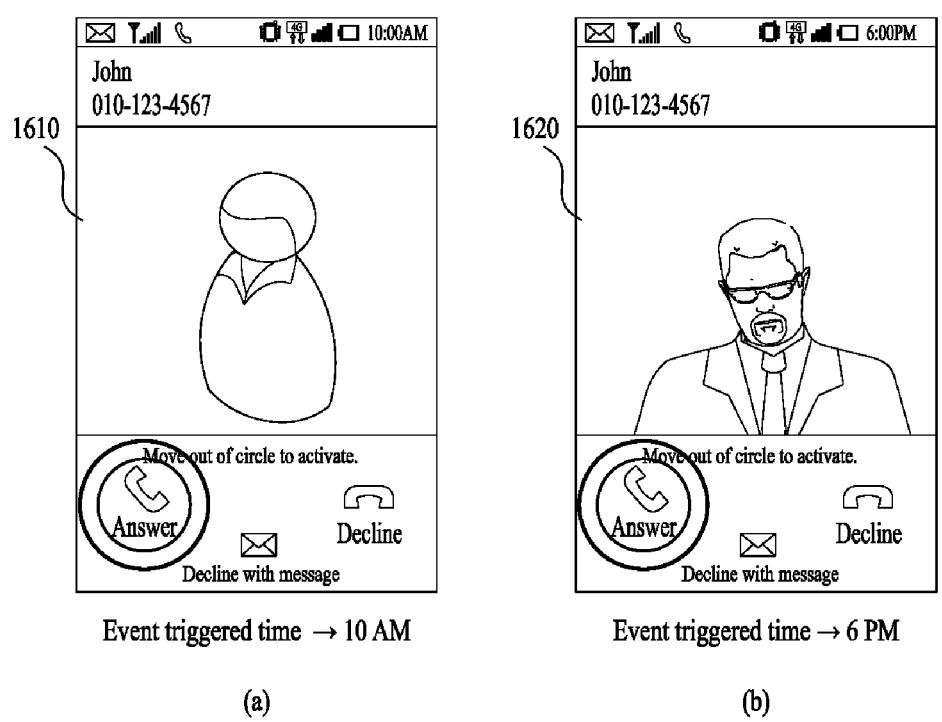
FIG. 16 and FIG. 17 are diagrams for examples to describe a changed phase of a data outputted through a display unit.
Figure 17:
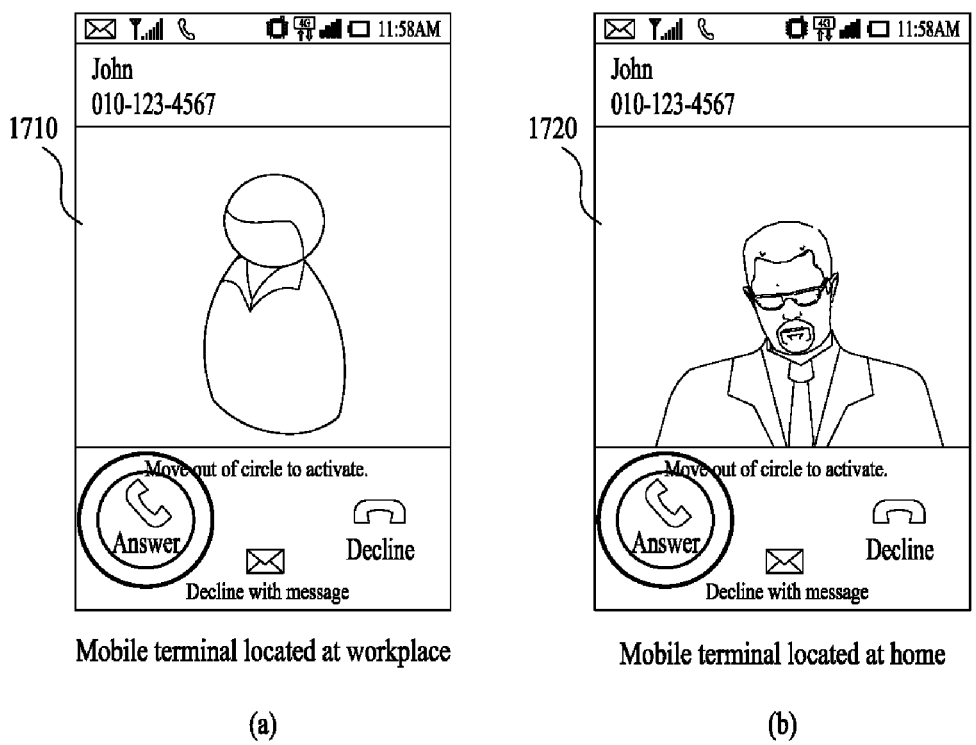

For instance, FIG. 16 and FIG. 17 are diagrams for examples to describe a changed phase of a data outputted through the display unit 151. In particular, FIG. 16 is a diagram for one example that a type of an outputted data is changed per time slot. And, FIG. 17 is a diagram for one example that a type of an outputted data is changed per location.

For clarity of the following description, assume that a time set to output a fake data ranges 9 AM to 5 PM. And, assume that a location set to output a fake data is a workplace.

According to one embodiment, if an event triggered by a prescribed counterpart is in a time set to output a fake data, the controller 180 can control the fake data to be outputted instead of an image data related to the prescribed counterpart. In the example shown in FIG. 16(a), as an event occurs 10 AM, a fake data 1610 is outputted. On the other hand, if an event triggered by a prescribed counterpart is output of a time set to output a fake data, the controller 180 can control an image data related to the prescribed counterpart to be outputted. In the example shown in FIG. 16(*b*), as an event occurs 6 PM, an image data 1620 related to a prescribed counterpart is outputted.

According to another embodiment, if the mobile terminal is in a location range set to output a fake data, the controller 180 can control the fake data to be outputted instead of an image data related to the prescribed counterpart. In the example shown in FIG. 17(*a*), as an event occurs when the mobile terminal is located at a workplace, a fake data 1710 is outputted. On the other hand, if the mobile terminal is located output of a location range set to output a fake data, the controller 180 can control an image data related to the prescribed counterpart to be outputted. In the example shown in FIG. 17(*b*), as an event occurs when the mobile terminal is located at home, an image data 1720 related to a prescribed counterpart is outputted.

Like the examples shown in FIG. 16 and FIG. 17, the controller 180 is able to determine whether to output an image data or a fake data in consideration of at least one of a preset time and a preset location range. In FIG. 16, a time element is considered only. In FIG. 17, a location element is considered only. Yet, of course, it is able to determine whether to output an image data or a fake data by considering both of a time element and a location element compositively.

<Determining Whether to Output Fake Data Depending on Level of Friendliness With Counterpart>

The mobile terminal according to the present invention is able to determine whether to output an image data or a fake data in consideration of a level of friendliness with a counterpart having triggered an event. For instance, if a level of friendliness with a prescribed counterpart having triggered an event is lower than a preset reference value, the controller 180 can control a fake data to be outputted instead of an image data related to the prescribed counterpart. For another instance, if a level of friendliness with a prescribed counterpart having triggered an event is higher than a preset reference value, the controller 180 can control an image data related to the prescribed counterpart to be outputted.

In doing so, the level of the friendliness with the counterpart can be manually determined by a user or may be automatically determined based on information on communication with the counterpart. In this case, the information on the communication with the counterpart may include at least one of the number of calls with the counterpart, the number of message transmissions to the counterpart, the number of prohibited word utterance on a call, the number of prohibited word detection from a message, and the like.

For instance, if the number of the calls with the counterpart and/or the number of message transmissions increases, it is able to give a high point to the friendliness level. Yet, although the number of calls with a user and/or the number of message transmissions to the user is high, if the number of utterance of the prohibited words (e.g., slangs, abusive languages, etc.) utterance in a content mentioned during a call or a message content, it is able to set the level of the friendliness with the counterpart to be lowered.

FIG. 18 is a diagram to describe an output of a display unit depending on a level of friendliness with a counterpart. FIG. 18(*a*) is a diagram for one example of a case that an event is triggered by a counterpart having a high friendliness level. And, FIG. 18(*b*) is a diagram for one example of a case that an event is triggered by a counterpart having a low friendliness level. In case that an event is triggered by a counterpart having a high friendliness level, referring to FIG. 18(*a*), the controller 180 can control an image data 1810 related to the counterpart to be outputted. On the contrary, in case that an event is triggered by a counterpart having a low friendliness level, referring to FIG. 18(*b*), the controller 180 can control a fake data having nothing to do with the counterpart to be outputted.

Like the example shown in FIG. 18, the controller 180 is able to determine whether to output an image data or a fake data depending on a level of friendliness with a counterpart.

<Output of Distorted Image Data>

As mentioned in the foregoing descriptions of the embodiments for outputting fake data with reference to FIGS. 14 to 18, a distorted image data can be outputted instead of the fake data. In this case, the distorted image data may mean a mosaicked photo/video, an artificially distorted photo/video, or the like.

<Output of Supplementary Data>

If an event is triggered by a prescribed counterpart, the controller 180 is able to control supplementary data on the prescribed counterpart to be outputted. In this case, the supplementary data may include one of a schedule data with the prescribed counterpart, a piece of writing recently posted by the prescribed counterpart at an SNS account of the prescribed counterpart, and the like.

The controller 180 is able to output the supplementary data together with an image data. Alternatively, the controller 180 can display not the image data but the supplementary data only. Embodiments for outputting the supplementary data are described in detail with reference to FIG. 19 and FIG. 20 as follows.

FIG. 19 and FIG. 20 are diagrams to describe examples of outputting supplementary data. In particular, FIG. 19 is a diagram for one example of outputting a schedule data with a counterpart. And, FIG. 20 is a diagram for one example of outputting a posting recently posted by a prescribed counterpart at an SNS account of the prescribed counterpart.

If a schedule data with a counterpart having triggered an event exists, the controller 180 can control the schedule data with the counterpart to be displayed. In doing so, like the example shown in FIG. 19(*a*), the controller 180 can output the schedule data together with an image data related to the counterpart. Like the example shown in FIG. 19(*b*), the controller 180 may output the schedule data only by omitting to output the image data related to the counterpart. When both of the schedule data and the image data are simultaneously outputted, referring to FIG. 19(*b*), the schedule data can be semi-transparently displayed over the image data. Alternatively, after a region for outputting the image data has been discriminated from a region for outputting the schedule data, it is able to control the image data and the schedule data to be displayed on the separate regions, respectively [not shown in the drawing].

Referring to FIG. 19(*c*), the controller 180 of the present invention can control a map screen, which indicated a place indicated by the schedule data, to be displayed.

Yet, although there is a planned schedule with a counterpart, if the schedule is supposed to be triggered in the future, it may be unnecessary display the schedule data now. Hence, only if the schedule data is present on the same date of the event occurrence, the controller 180 can control the schedule data to be outputted. Alternatively, only if the schedule data is present in a prescribed time from an event triggered time, the controller 180 can control the schedule data to be outputted.

If there is a posting recently posted at an SNS account by the counterpart having triggered an event, the controller 180 can control the recent posting of the counterpart to be displayed. In doing so, like the example shown in FIG. 20(a), the controller 180 can output a posting only by omitting an output of an image data related to a counterpart. Like the example shown in FIG. 20(b), the controller 180 can output a posting together with an image data related to a counterpart. In particular, the controller 180 may control an object 2010, which indicates a source of the posting, to be outputted as well. If the object 2010 is touched, as mentioned in the foregoing description, it is able to attempt an access to an SNS account of a counterpart.

Moreover, in case that both a posting and an image data are simultaneously outputted, like the example shown in FIG. 20(b), the posting can be semi-transparently displayed over the image data. Alternatively, after a region for outputting the image data has been discriminated from a region for outputting the schedule data, it is able to control the image data and the schedule data to be displayed on the separate regions, respectively [not shown in the drawing].

And, the controller 180 can control a posting (e.g., a posting registered in a prescribed past time from an event triggered time) recently registered by a counterpart or a posting (e.g., a posting registered after a timing point of a last access to an SNS account of a counterpart) failing to be checked by a user to be displayed.

Accordingly, embodiments of the present invention provide various effects and/or features.

First of all, the present invention provides a mobile terminal and controlling method thereof, by which user's convenience can be enhanced.

Secondly, the present invention provides a mobile terminal and controlling method thereof, by which an image related to a counterpart can be displayed despite that a profile photo of the counterpart is not registered in a phonebook.

Thirdly, the present invention provides a mobile terminal and controlling method thereof, by which a new image can be displayed in response to each occurrence of an event.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an image related to a counterpart can be displayed despite that a profile photo of the counterpart is not registered in a phonebook.

Another object of the present invention is to provide a mobile terminal and controlling method thereof, by which a new image can be displayed in response to each occurrence of an event.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit configured to display information, a wireless communication unit configured to communicate with an external server that stores first image data and to communicate with a counterpart terminal, a memory to store a second image data, and a controller, in response to an event triggered by the counterpart terminal, to extract an image data related to a counterpart from one of the first image data and the second image data, and the controller to output the extracted image data on a portion of the display unit to notify an occurrence of the event.

In another aspect of the present invention, as embodied and broadly described herein, a method of controlling a mobile terminal according to the present invention may include recognizing an event triggered by a counterpart terminal, extracting an image data related to a counterpart from one of first image data in an external server and second image data in a memory, and outputting the extracted image data at a portion of a display unit to notify an occurrence of the event.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal, the method comprising:
   communicating with at least one server;
   recognizing an event triggered by a counterpart terminal, wherein the event includes a case that an incoming call is received from the counterpart terminal;
   in response to recognizing the event, automatically extracting image data related to the counterpart terminal from a messenger server or an SNS (social networking service) server among the at least one server, wherein the image data corresponds to a profile photo registered in the messenger server or the SNS server;
   displaying all of a first option for answering the incoming call, a second option for declining the incoming call, the image data in order to announce that the event has occurred;
   displaying an object for indicating that the image data is extracted from the SNS server;
   accessing an account of the counterpart terminal in the SNS server in response to touching the object; and
   setting the image data as a background of the event in response to receiving a prescribed user input.

2. The method of claim 1, wherein the mobile terminal accesses the SNS server related to the counterpart terminal with receiving the incoming call from the counterpart terminal.

3. The method of claim 1, wherein the object is displayed on the image data, further the image data occupies a larger portion than each portion of the displayed first option and the second option.

4. The method of claim 1, further comprising:
   displaying an ID for using the SNS server with a content of a message recently transceived with the counterpart terminal.

5. The method of claim 1, wherein the displayed object is linked to location information related to the image data stored in the messenger server or the SNS server.

6. A mobile terminal, the mobile terminal comprising:
   a network interface configured to communicate with at least one server; and
   a controller configured to:
      recognize an event triggered by a counterpart terminal, wherein the event includes a case that an incoming call is received from the counterpart terminal,
      in response to recognize the event, automatically extract image data related to the counterpart terminal from a messenger server or an SNS (social networking service) server among the at least one server, wherein the image data corresponds to a profile photo registered in the messenger server or the SNS server,
      control a display module to display all of a first option for answering the incoming call, a second option for declining the incoming call, and the image data in order to announce that the event has occurred,
      control the display module to display an object for indicating that the image data is extracted from the SNS server;
      access an account of the counterpart terminal in the SNS server in response to touching the object, and
      set the image data as a background of the event in response to receiving a prescribed user input.

7. The mobile terminal of claim 6, wherein the mobile terminal accesses the SNS server related to the counterpart terminal with receiving the incoming call from the counterpart terminal.

8. The mobile terminal of claim 6, wherein the object is displayed on the image data, further the image data occupies a larger portion than each portion of the displayed first option and the second option.

9. The mobile terminal of claim 6, wherein the controller is further configured to control the display module to display an ID for using the SNS server with a content of a message recently transceived with the counterpart terminal.

10. The mobile terminal of claim 6, wherein the displayed object is linked to location information related to the image data stored in the messenger server or the SNS server.

* * * * *